W. M. SCHWARTZ & H. COULSTON.
CONVEYING MEANS.
APPLICATION FILED AUG. 13, 1912.

1,054,459.

Patented Feb. 25, 1913.

2 SHEETS—SHEET 1.

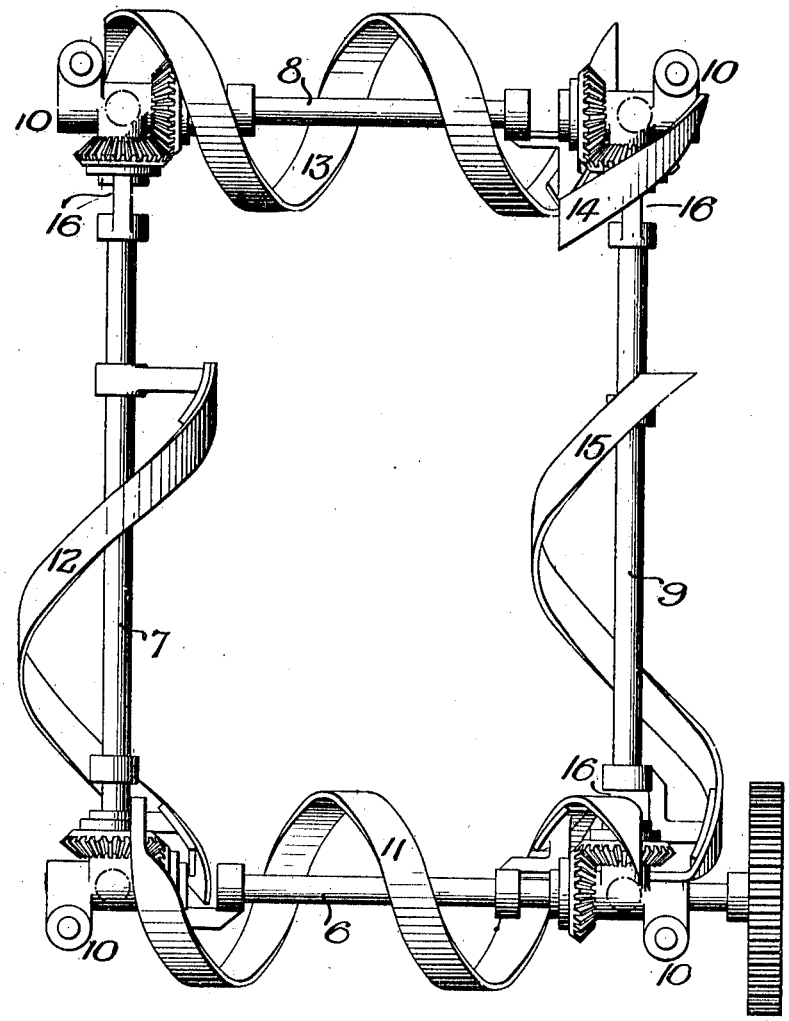

UNITED STATES PATENT OFFICE.

WALTER M. SCHWARTZ AND HARRY COULSTON, OF PHILADELPHIA, PENNSYLVANIA, ASSIGNORS TO THE PHILADELPHIA TEXTILE MACHINERY COMPANY, OF PHILADELPHIA, PENNSYLVANIA, A CORPORATION OF PENNSYLVANIA.

CONVEYING MEANS.

1,054,459.  Specification of Letters Patent.  Patented Feb. 25, 1913.

Application filed August 13, 1912. Serial No. 714,840.

*To all whom it may concern:*

Be it known that we, WALTER M. SCHWARTZ and HARRY COULSTON, citizens of the United States, and residents of Philadelphia, Pennsylvania, have invented certain Improvements in Conveying Means, of which the following is a specification.

The object of our invention is to provide a means for traversing carriers or other forms in a quadrangular endless path.

The invention is especially adapted for use in connection with hosiery drying apparatus, or apparatus for singeing hosiery, but it will be understood that the invention can be used for conveying a carrier for any purpose where it is desired to drive the carrier in an endless path.

Figure 1:
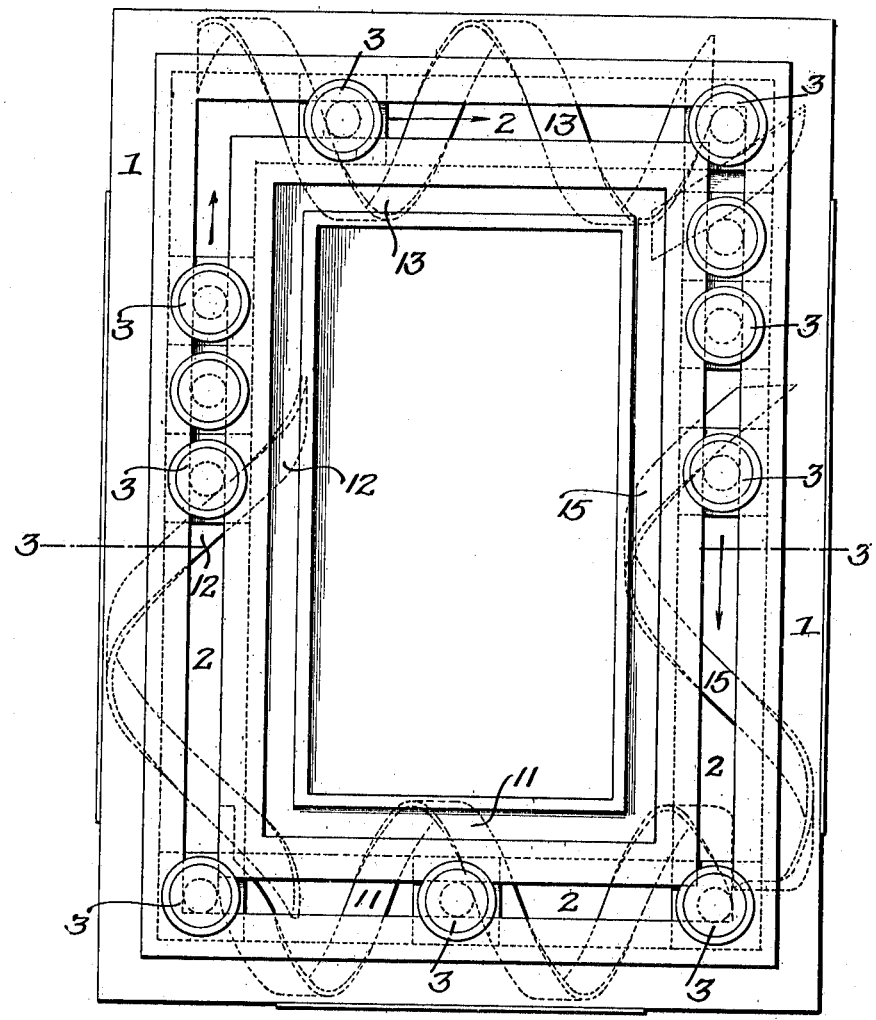
Figure 3:
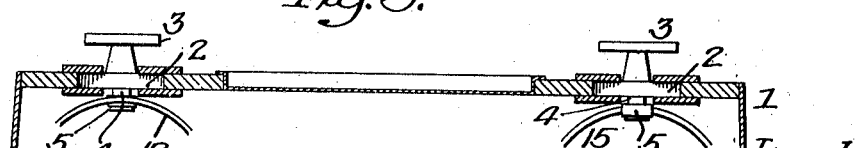

In the accompanying drawings:—Figure 1, is a plan view of a table showing the carriers in position; Fig. 2, is a plan view showing the cams for traversing the carriers; and Fig. 3, is a transverse sectional view on the line 3—3, Fig. 1.

1 is a table or other support, having a quadrangular slot 2 therein, forming a guideway.

3, 3 are carriers adapted to the guideway, the face of the carriers being square so that while the carriers are free to slide in the guideway, they are held from turning therein. The guideway has upper and lower flanges to hold the carriers vertically. In the present instance, depending from each carrier is a spindle 4 having a roller 5 arranged to be engaged by driving cams. The carrier may support any suitable device, according to the use to which the invention is applied. Under the table, in the present instance, are four shafts 6, 7, 8 and 9, geared together as shown in Fig. 2, and adapted to bearings 10 secured in any suitable manner to the frame of the table. 11 is a scroll cam on the shaft 6 extending under the forward guideway of the table.

12 is a longitudinal cam mounted on the shaft 7, and this cam terminates short of the inner end of the shaft.

13 is a cam on the shaft 8 extending practically the full length of the way in the table, and 14 is a short cam on one end of the shaft 9 for removing the carrier from the control of the last mentioned cam. Also on this shaft is a long cam 15 separated from the short cam by a space. By this construction the carriers are under the control of the cams except at two points where they accumulate until one carrier pushes the other into the path of a cam. This is particularly used in drying hosiery where part of the table is covered by a drying chamber, so that the hosiery forms are fed into the chamber and allowed to remain there for a certain length of time.

It will be noticed that one end of each longitudinal cam overlaps the ends of the forward transverse cam, so that the carrier is not released by one cam until the other cam has engaged it. This construction prevents the accidental movement of the carriers out of the path of the cams and insures the proper movement of all the carriers. This same construction is used where the rear transverse cam delivers the carrier to the short longitudinal cam.

It will be noticed that the hubs of the bevel gear wheels are extended and are recessed at 16 for the free movement of the cams as they rotate, so that the end of the cam can properly engage the carriers.

We claim:—

1. The combination of a table having angular guideways therein; a carrier arranged to travel in the guideways; and a cam under each section of the guideways for traversing the carrier in a particular guideway; the cams being so arranged that the carrier will be transferred from one section of the guideways to another, causing the carrier to travel in a continuous path.

2. The combination of a table in which there is a quadrangular guideway; carriers mounted in the guideway; four shafts under the table; and a cam on each shaft engaging the carriers, so that, as the shafts rotate, the carriers will be fed forward in an endless path.

3. The combination of a table having a quadrangular guideway therein; carriers mounted in the guideway; four cam shafts under the table geared together; and scroll cams on each shaft, the ends of some of the cams overlapping the ends of others so as to retain the control of the carrier while being traversed at a corner.

4. The combination in a table having a quadrangular guideway therein; of a series of carriers mounted in the guideway; four shafts geared together; scroll cams on the transverse shafts extending the full length of the guideway; with scroll cams on the longitudinal shafts stopping short of the inner ends of said shafts; and a short scroll cam on the extreme end of one of said shafts so that, as the carriers are traversed over the guideway, they will dwell at two points in their travel.

In testimony whereof, we have signed our names to this specification, in the presence of two subscribing witnesses.

WALTER M. SCHWARTZ.
HARRY COULSTON.

Witnesses:
  WM. A. BARR,
  JOS. H. KLEIN.